United States Patent [19]
Murray

[11] Patent Number: 6,130,268
[45] Date of Patent: Oct. 10, 2000

[54] TWO COMPONENT POLYURETHANE CONSTRUCTION ADHESIVE

[75] Inventor: Pat L. Murray, Spring, Tex.

[73] Assignee: Polyfoam Products, Inc., Spring, Tex.

[21] Appl. No.: 09/325,980

[22] Filed: Jun. 4, 1999

Related U.S. Application Data

[63] Continuation-in-part of application No. 08/880,465, Jun. 23, 1997, Pat. No. 5,951,796.

[51] Int. Cl.⁷ .................................................... C08G 18/48
[52] U.S. Cl. ........................... 521/131; 521/159; 521/174
[58] Field of Search .................................. 521/159, 174, 521/131

[56] References Cited

U.S. PATENT DOCUMENTS

| | | | |
|---|---|---|---|
| 4,170,440 | 10/1979 | Gusmer et al. | 417/426 |
| 4,199,303 | 4/1980 | Gusmer et al. | 417/216 |
| 4,244,901 | 1/1981 | Wencley et al. | 264/46.4 |
| 4,444,976 | 4/1984 | Rabito | 528/60 |
| 4,489,176 | 12/1984 | Kluth et al. | 521/144 |
| 4,636,425 | 1/1987 | Johnson et al. | 428/198 |
| 4,996,812 | 3/1991 | Venable | 52/408 |
| 5,294,358 | 3/1994 | Dantinne et al. | 252/67 |
| 5,296,516 | 3/1994 | Krueger et al. | 521/131 |
| 5,318,996 | 6/1994 | Yu-Hallada et al. | 521/131 |
| 5,362,342 | 11/1994 | Murray et al. | 156/71 |
| 5,409,962 | 4/1995 | Bartlett et al. | 521/88 |
| 5,455,283 | 10/1995 | Green et al. | 521/175 |
| 5,575,871 | 11/1996 | Ryoshi et al. | 156/78 |

OTHER PUBLICATIONS

The Condensed Chemical Dictionary, Tenth Ed., pp. 20–21, 1981.

*Primary Examiner*—Rachel Gorr
*Attorney, Agent, or Firm*—Akin, Gump, Strauss, Hauer & Feld, L.L.P.

[57] ABSTRACT

A two component polyurethane adhesive and a method of bonding construction materials to various construction substrates. The adhesive being the reaction product of two separate components that are mixed together immediately prior to application upon dispensing onto a substrate. The first part of the adhesive, referred to as the "A-side," may be either an NCO terminated prepolymer or a polymeric MDI (methylene diphenyl diisocyanate). The second part of the adhesive, referred to as the "B-side," is a blend of rigid, elastomeric, and flexible polyols and extenders. The adhesive formed by mixing the A-side and B-side components, is a frothing foam that has a consistency such that it does not run or drip when applied to the substrate, that expands upon application to the substrate surface to fill voids or imperfections, that collapses when the material to be bonded is placed in contact with the adhesive, and that has a rapid cure time.

34 Claims, 3 Drawing Sheets

TWO COMPONENT POLYURETHANE CONSTRUCTION ADHESIVE

CROSS-REFERENCE TO RELATED APPLICATION

This application is a continuation-in-part application of Ser. No 08/880,465 filed Jun. 23, 1997, issued as U.S. Pat. No. 5,951,796.

FIELD OF THE INVENTION

The present invention relates to a two component polyurethane adhesive and a method of bonding various types of construction materials. The two component polyurethane adhesive and method of bonding is particularly adapted for use as a construction adhesive in the installation of ceramic tile, asphalt shingles, roof insulation board, and wood flooring.

BACKGROUND OF THE INVENTION

Traditionally, construction materials have been bonded or secured using materials such as mortar and mechanical fasteners. It is widely acknowledged that these materials have many disadvantages. Specifically, mortar can be slow to set and brittle after curing. Mechanical fasteners are susceptible to corrosion from the elements. In addition, foot traffic on flooring materials often causes the mechanical fasteners to loosen and retract from the materials they are meant to hold in place.

To overcome the disadvantages of traditional bonding or securing methods and materials, various adhesives have been applied in construction applications. However, many of these adhesives have had their own disadvantages. Solvent-based adhesives such as urethanes, latex, acrylics, and bitumens are known in the art but these often have a negative environmental impact. The use of these adhesives has been restricted due to emissions of volatile organic compounds (VOCs). In addition, these adhesives generally have a slow cure rate and can be difficult to handle during application. Adhesives containing chlorinated hydrocarbons or ketone based solvents also have significant disadvantages for use in construction because they can be undesirably odorous, present safety hazards, and are also environmentally unfavorable.

The use of moisture cured, single component polyurethane adhesives to bond various types of construction materials also has been known in the prior art. Generally speaking, a single component polyurethane adhesive refers to a composition of polyurethane chemicals that have been pre-mixed and stored in a dry environment. These single component polyurethane adhesives then react with moisture from the air upon application to a substrate. There are many disadvantages of this single component polyurethane adhesive including slow set time, slow cure rate, high cost per pound, limited container quantities, and poor shelf life.

Some two component polyurethane systems have been used as adhesives in certain applications. However, these two component systems have been limited to use in specific applications and have characteristics which limit their applications further. U.S. Pat. No. 4,244,901 discloses a method of bonding wallboard or drywall to its structural members. The '901 method requires high pressure to apply an expanding polyurethane foam and discloses the use of a "hard" chlorofluorocarbon blowing agent which is not environmentally safe. The high pressure application of this foam, as well as the expansion properties of the foam itself, make this method impractical for application to small area jobs such as installation of ceramic floor tile.

U.S. Pat. No. 4,636,425 discloses a method of bonding with a two component polyurethane system in which a fine mist of a foamable liquid polyurethane is sprayed onto a surface to form discrete droplets or pods of adhesive. This method requires the use of high pressure which also makes the systems impractical for use on a small scale. Additionally, this method discloses the use of a "hard" chlorofluorocarbon, R-11 as the blowing agent.

U.S. Pat. No. 5,362,342 discloses a two component polyurethane adhesive for use in applying roof tiles to a roof substrate. This method discloses application of a stream of adhesive on the roof substrate which expands on the roof substrate. The thickness of this adhesive foam does not significantly diminish after coming into contact with the roof tile which may limit application to other construction materials.

It would be desirable to have an environmentally friendly adhesive and method of bonding that could be used in a broad variety of construction applications and that could be used with low pressure, portable dispensing equipment. It would be particularly desirable if the adhesive could expand to fill voids or imperfectionsbetween the surfaces being bonded, but would then collapse allowing a thin layer of adhesive to bond the construction materials together. Further, it would be desirable if the adhesive would have a rapid cure time and would produce a strong bond that retained some elasticity.

SUMMARY OF THE INVENTION

The present invention is a two component polyurethane adhesive and a method of bonding construction materials to various construction substrates.

The adhesive of the present invention is the reaction product of two separate components that are mixed together immediately prior to application or dispensing onto a substrate. The first part of the adhesive, referred to as the "A-side," may be either an NCO terminated prepolymer or a polymeric isocyanate. The NCO terminated prepolymers may be formed from the reaction of diisocyanates such as, but not limited to, toluene diisocyanate (TDI), diphenylmethane diisocyanate (MDI), hexamethylene diisocyanate (HDI) and isophorone diisocyanate (IPDI) with one or more polyols. In some circumstances MDI is easier to work with because MDI has a lower vapor pressure than many other diisocyanate compounds. Also, MDI is generally less expensive than the other available diisocyanates. The polymeric isocyanate may include, but is not limited to, polymeric MDI. The second part of the adhesive, referred to as the "B-side," is a blend of rigid, elastomeric and flexible polyols and extenders. The adhesive of the present invention, formed by mixing the A-side and B-side components, is a frothing foam that has a consistency such that it does not run or drip when applied to the substrate, that expands upon application to the substrate surface to fill voids or imperfections, that collapses when the material to be bonded is placed in contact with the adhesive on the substrate, and that has a rapid cure time.

The method of the present invention includes the steps of: (1) providing an A-side NCO terminated prepolymer, polymeric MDI prepolymer or a polyisocyanate and a B-side blend, each containing a "soft" environmentally safe hydrofluorocarbon or hydrochlorofluorocarbon blowing agent, and also a means to mix and dispense the adhesive foam reaction product of the two components; (2) mixing the A-side and B-side components under low pressure and dispensing the adhesive foam onto a surface of a construction substrate; (3) allowing the adhesive foam to expand over the surface of the construction substrate and to initiate cell rupture; (4) placing the construction material to be bonded in contact with the adhesive foam on the surface of the construction substrate; and (5) allowing the adhesive foam to partially collapse and cure, forming a void-filling membrane that bonds the construction material to the construction substrate. The method of bonding provides for application of a single bead of adhesive or spraying of the adhesive to cover large surface areas.

BRIEF DESCRIPTION OF THE VIEWS OF THE DRAWINGS

In order to more fully understand the drawings referred to in the detailed description of the present invention, a brief description of each drawing is presented, in which.

DETAILED DESCRIPTION OF PREFERRED EMBODIMENT

The present invention is a two component polyurethane adhesive and a method of bonding construction materials to various construction substrates. As used herein, "construction materials" refers generally to materials used in the construction of residential and commercial dwellings, and includes, but is not limited to, ceramic tiles, wood parkay flooring, drywall or exterior sheathing, decorative wall boards, decorative brick and stone, trim molding, wood subfloor, roof decking, asphalt roof shingles, a roof insulation board applied to wood, steel and concrete decks. As used herein, "construction substrates" generally refers to various structural or foundational surfaces encountered in the construction of residential and commercial dwellings and includes, but is not limited to, wood subfloors, concrete subfloors, studs, joists, rafters, shingles, wood, concrete blocks, steel and concrete decks.

The Adhesive

The adhesive of the present invention is the reaction product of two separate components that are mixed together immediately prior to application upon dispensing onto a substrate. The first part of the adhesive, referred to as the "A-side," is an NCO terminated prepolymer or a polymeric isocyanate. The NCO terminated prepolymers may be formed from diisocyanates such as, but not limited to, toluene diisocyanate (TDI), diphenylmethane diisocyanate (MDI), hexamethylene diisocyanate (HDI) and isophorone diisocyanate (IPDI). The polymeric isocyanate and NCO terminated prepolymers are useful for preparing flexible adhesive foams. Polyisocyanates are useful for preparing rigid adhesive foams. The second part of the adhesive, referred to as the "B-side," is a blend of elastomeric and flexible polyols and extenders.

The adhesive of the present invention, formed by mixing the A-side and B-side components, is a frothing foam that has a consistency such that it does not run or drip when applied to the substrate. This is particularly important when the adhesive is being used on a sloped surface, such as a pitched roof, or used overhead. The adhesive expands upon application to the substrate surface to fill voids or imperfections, and collapses when the material to be bonded is placed in contact with the adhesive. Additionally, the adhesive has a rapid cure time. Preferably, the adhesive of the present invention has a consistency similar to that of shaving creams and has a cure time in the range of six to twelve minutes. Preferably, the adhesive can expand between about 10% to about 50% of original volume to fill gaps, crevices, or uneven spots in the substrate or occurring between the materials to be bonded.

It is understood that when used herein, the composition percentages refer to weight percentages, unless otherwise stated. Additionally, when referring to a polyol by its molecular weight, the stated molecular weight is the nominal number average molecular weight. The actual number average molecular weight can include a range above and below the nominal number average molecular weight. Preferably, the actual number average molecular weight of the polyols used in the present invention are within a range of about 300 MW units above or below the stated nominal number average molecular weights.

The preferred A-side prepolymer component for flexible adhesive formulations is prepared by reacting a polymeric MDI or a polyisocyanate with a polyether polyol having an average molecular weight (MW) of from about 1000 to about 6500, to which a flame retardant, and a soft hydrofluorocarbon as the primary blowing agent are added. A commercially acceptable polymeric MDI is available from the Bayer Corporation under the name Mondur 582, however, other commercially available polymeric MDI of similar characteristics can also be used. The preferred polyetherpolyol used to form the A-side component is a nominal 1000–6500 MW polyetherpolyol, having a functionality ranging from about 2 to about 3, capped with ethylene oxide and having a primary hydroxyl content of from about 15% to about 70%. Commercially acceptable polyols are available from Olin Chemical, such as Poly-G-55-28, Poly-G-55-56, Poly-G-55-112, Poly-G-85-28 and Poly-G-76-120, having an average hydroxyl number of from about 25 to about 125 and which are generally used in non-foam urethanes such as coatings, sealants, elastomers, and adhesives. The elastomeric properties of the finished adhesive may be varied by choosing polyether polyols with appropriate characteristics, for example, selecting a difunctional polyether polyol versus a trifunctional polyether polyol. Other commercially available polyether polyols of similar characteristics can also be used.

The preferred A-side component for rigid adhesive formulations is prepared by mixing a polyisocyanate with a flame retardant, an emulsifier and a soft hydrofluorocarbon as the primary blowing agent. Commercially acceptable polyisocyanates are available from ICI Chemicals under the trademark Rubinate M, Bayer Chemical Company under the trademark Mondur MR and from The Dow Chemical Company under the trademark PAPI. Alternatively, other commercially available polyisocyanates of similar characteristics can also be used. The polyisocyanate can have a molecular weight from about 150 to about 500. The polyisocyanate may have from about 10% to about 50% free isocyanate groups or, more preferably, from about 12% to about 15% free isocyanate groups.

Acceptable flame retardants for use in the A-side prepolymer include Fryol PCF made by AKZO Chemical, Antiblaze 80 from Albright-Wilson or their commercial equivalents. The amount of flame retardant used is dependent upon the type used, however, generally, the amount of flame retardant used should be such that the cured adhesive will meet the flammability requirements of the intended application.

Acceptable primary blowing agents includes hydrochlorofluorocarbon R22 (HCFC-R22) (CHCl $F_2$) or hydrofluorocarbon 134A (HFC-134A) (1,1,1,2-tetraflouro ethane). CFC-R12 and similar "hard" HCFC's are preferably not used due to their reported deleterious effects to the earth's ozone layer. "Hard" blowing agents generally are those having an ozone depletion potential greater than 0.5. "Soft" blowing agents generally have an ozone depletion potential less than 0.5, preferably less than 0.2 and more preferably less than 0.1.

The preferred A-side prepolymer for a flexible formulation is produced in a manner such that there is about 18% to about 28% free NCO (isocyanate groups) in the prepolymer. Most preferably, there is between about 20% and about 24% free NCO. The preferred prepolymer can be produced by adding 100 parts of the preferred polyether polyols to a reactor equipped with a stirring means and a nitrogen blanket. Approximately 340 to about 375 parts of polymeric MDI, with a functionality of about 2.7, is then added to the reactor and the components are reacted at a temperature between about 50° C. to about 70° C. until the prepolymer has between about 13% and about 23% free NCO. Between about 2% and about 10%, by weight, flame retardant is added and the mixture is allowed to cool to about 25° C. The cooled prepolymer is then transferred to a pressure vessel capable of withstanding at least 250 psi operating pressures. Soft hydrofluorocarbonis then added in an amount equal to about 3% to about 9% of the total mixture and blended into the prepolymer.

The preferred A-side polyisocyanate mixture is produced so as to have a ratio of isocyanate groups in the A-side mixture to hydroxyl groups in the B-side in which the ratio is preferably about 0.9 to about 1.2.

The preferred B-side components are prepared by blending together polyether polyols, and then adding a diol extender, a catalyst, an emulsifier, and a soft hydrofluorocarbon for use as a primary blowing agent.

One preferred blend of polyether polyols includes 6500 MW polyether triol, a 1000 MW polyether triol, and a 1400 MW polyether triol. In the blend of polyether polyols used to form this embodiment of the B-side component the preferred 6500 MW triol is an ethylene oxide capped polyether triol having a primary hydroxyl content of about 78% and a hydroxyl number of about 27. A commercially acceptable 6500 MW polyether triol, Poly-G-85-29, is available from Olin Chemicals. This polyol was generally developed for use in RIM (reaction injection molding) processes, coatings, sealants, microcellular urethanes, cans and filled elastomers. Other commercially available polyether triols of similar characteristics can also be used.

The preferred 1000 MW triol for this embodiment of this blend of polyols is an oxypropylatedpolyethertriol having a hydroxyl number of about 168 and approximately 100% secondary hydroxyl groups. A commercially acceptable 1000 MW polyether triol is available from Olin Chemical as Poly-G-30- 168. This polyol is generally used in froth foams, elastomers, and coating applications. Other commercially available polyether triols of similar characteristics can also be used.

The preferred 1400 MW triol for this embodiment of this blend of polyols is a highly reactive ethylene oxide capped polyether triol having a minimum primary hydroxyl content of about 70% and a hydroxyl number of about 120. A commercially acceptable 1400 MW polyether triol is available from Olin Chemical as Poly-G-76-120. This polyol has primarily been used in non-foam urethanes such as coatings, sealants, elastomers, and adhesives. Other commercially available polyether triols of similar characteristics can also be used.

Preferably, this embodiment of the B-side component includes about 20% to about 35% by weight of the 6500 MW triol, about 35% to about 50% by weight of the 1000 MW triol, and about 15% to about 25% by weight of the 1400 MW triol. More preferably, this embodiment of the B-side component includes about 25% to about 30% by weight of the 6500 MW triol, about 38% to about 45% by weight of the 1000 MW triol, and about 18% to about 22% by weight of the 1400 MW triol.

A preferred blend of polyols in a second embodiment, using a non-prepolymer A-side to produce a rigid adhesive, of the B-side component includes a 1200 MW polyether polyol and a 1000 MW polyether triol. The preferred 1200 MW polyether polyol in this second embodiment of the B-side components is a sucrose-based polyether polyol, capped with polypropylene oxide, having a hydroxyl number of about 375 and a functionality greater than about 4.0. A commercially acceptable 1200 MW polyether polyol, Poly-G® 74-376, is available from Olin Chemicals. Other commercially available polyether polyols of similar characteristics can also be used.

A preferred 1000 MW polyether triol in this second embodiment of the B-side components is an oxypropylated polyether triol having a hydroxyl number of about 168 and approximately 100% secondary hydroxyl groups. A commercially acceptable 1000 MW polyether triol is available from Olin Chemical as Poly-G-30-168. Other commercially available polyether triols of similar characteristics can also be used.

Preferably this second embodiment of the B-side components includes from about 25% to about 35% by weight of the 1200MW polyether polyol and from about 30% to about 40% of the 1000 MW polyether triol. More preferably, this embodiment of the B-side components includes from about 28% to about 31% by weight of the 1200 MW polyether polyol and from about 33% to about 36% of the 1000 MW polyether triol.

A preferred blend of polyol in a third embodiment of the B-side components includes a 2000 MW polyether diol, a 3000 MW polyether triol and a 1000 MW polyethertriol. The preferred 2000 MW polyetherdiol of this embodiment of the B-side components is an ethylene oxide capped polyether diol having a primary hydroxyl content of about 70% to about 88%. A commercially acceptable 2000 MW polyether diol, Poly-G-55-56, is available from Olin Chemicals. Other commercially available polyether diols of similar characteristics can be used.

The preferred 3000 MW polyether triol of this embodiment of the B-side components is a polyether triol with ethylene oxide incorporated internally in the polyether portion of the polyether triol. The preferred 3000 MW polyether triol of this embodiment is a polyether triol having a hydroxyl number of from about 54 to about 58 and from about 70% to about 90% secondary hydroxyl groups. A commercially acceptable 3000 MW polyether triol is available from Olin Chemicals as Poly-G 32-56. Other commercially available polyether diols of similar characteristics can be used.

The preferred 1000 MW polyether triol for this embodiment of the B-side component is an oxypropylated polyether triol having a hydroxyl number of about 168 and approximately 100% secondary hydroxyl groups. A commercially acceptable 1000 MW polyether triol is available from Olin Chemicals as Poly-G-30-168. Other commercially available polyether diols and triols of similar characteristics can be used.

Preferably, this third embodiment of the B-side components includes from about 12% to about 28% by weight of the 3000 MW polyether triol, from about 20% to about 40% by weight of the 1000 MW polyether triol, and from about 14% to about 22% by weight of the 2000 MW polyether diol. More preferably, the B-side component includes from about 13% to about 15% by weight of the 3000 MW polyether triol, from about 34% to about 36% by weight of the 1000 MW polyether triol, and from about 16% to about 18% by weight of the 2000 MW polyether diol.

A diol extender, a catalyst, a compatibilizer, an emulsifier, and a soft hydrofluorocarbon are added to the blend of polyols forming the B-side component. A surfactant may also be added to this blend. Acceptable extenders include 1,4 butanediol (Butylene Glycol), diethylene glycol, and ethylene glycol as are commercially available from Ashland Chemical. Preferably, the B-side component is about 5% to about 15% diol extender. More preferably, the B side component is from about 7% to about 12% diol extender. Acceptable compatibilizers include, but are not limited to, ethoxylated nonyl phenol from Ashland Chemical and ethoxylated coca amine or ethoxylated alkyl quaternaries from Sherox.

A catalyst such as an organotin compound, available from Witco Chemical, can be used in the B-side component. Preferably, the B-side component is about 0.02% to about 0.40% catalyst. More preferably, the B-side component is about 0.08% to about 0.15% catalyst. Other catalysts are acceptable for use such as are known by those skilled in the art.

Acceptable emulsifiers for use in the B-side component include: odorless mineral spirits as available from Ashland Chemical; propylene carbonate as available from Texaco; DBE (dibasic ester) as available from DuPont; DB acetate, DE acetate, and TXIB plasticizer as available from Eastman Chemical; and Neodene 16 as available from Shell Chemical or Gulftene 16 available from Chevron. Preferably, the B-side component is about 1% to about 11.3% emulsifier. More preferably, the B-side component is about 2% to about 3% emulsifier.

Preferably, the soft hydrofluorocarbon blowing agent added to the B-side component is the same as that used in the A-side component. Preferably, the B-side component is about 1% to about 11% blowing agent. More preferably, the B-side component is about 6% to about 8% blowing agent.

The Method of Bonding

The method of the present invention includes the steps of (1) providing an A-side polyisocyanate or polyisocyanate prepolymer component and a B-side polyol blend, each having a soft hydrofluorocarbon blowing agent, and also providing a means to mix and dispense the adhesive foam reaction product of the two components; (2) mixing the A-side and B-side components under low pressure and dispensing the adhesive foam onto the surface of a construction substrate; (3) allowing the adhesive foam to expand over the surface of the construction substrate and to initiate cell rupture; (4) placing the construction material to be bonded in contact with the adhesive foam on the surface of the construction substrate; and (5) allowing the adhesive foam to partially collapse and cure, forming a void-filling membrane that bonds the construction material to the construction substrate.

When a polymeric MDI prepolymer or an NCO terminated prepolymer is used in the A-side of step one of the method of bonding a flexible adhesive is formed. Rigid adhesives are formed when the A-side component of step one of the method of bonding uses a polyisocyanate which has not been converted into a prepolymer and the B-side polyether glycols with functionality greater than 4.0.

The method of the present invention preferably utilizes portable dispensing equipment capable of separately storing the two components until application is desired. The dispensing equipment should have a mixing head that adequately mixes the two components and the soft hydrofluorocarbon blowing agents prior to dispensing the adhesive foam. The portable equipment capable of dispensing the adhesive foam is known to those skilled in the art and is described more fully in U.S. Pat. No. 5,362,342, issued to Murray et. al, which is hereby incorporated by reference in its entirety. Examples of portable dispensing equipment acceptable for use in the method of bonding of the present invention include the Foampro® equipment or the Pro-Pack™ kits available through Polyfoam Products, Inc., Spring, Tex.

The soft hydrofluorocarbons contained in both the A-side and B-side components are important to the method of the present invention. The soft hydrofluorocarbon,HFC 134a for example, aids in mixing and acts as a mechanical frothing agent. The use of an environmentally safe "soft" blowing agents, such as HCFC R-22 or HFC 134a, to mix and mechanically froth the construction adhesive during dispensing contributes to the ability to successfully operate at low pressures.

During the step of mixing and dispensing, the soft hydrofluorocarbon that acts as the primary blowing agent and which is a gas under pressure, expands as soon as it enters the mixing chamber on the dispensing equipment. The expansion of the blowing agent creates pressure and turbulence that aids in mixing. The mixed components, when exiting the dispensing gun, should have sufficient body or viscosity to prevent the adhesive foam from migrating away from the placement point.

The ProPack™ disposable kits which can be used to dispense adhesive according to the present invention utilize a static mixer having a bladed element placed within a small bore tube which causes the two components to change direction and fold together as they pass through the tube. These kits do not require the use of additional compressed air at the mixing nozzle to aid in mixing as do many types of dispensing and mixing equipment known to those skilled in the art.

In the method of the present invention, the mixing of the components can occur under low pressure. Depending upon the particular dispensing equipment utilized, the two components can be mixed at pressures of about 400 psi or lower. When utilizing the ProPack™ disposable kits, an initial pressure of about 340 psi is generally used to mix the components. Acceptable mixing of the A-side and B-side components can even be obtained at 100 psi and lower due to the froth technology. For comparison purposes, prior art methods of mixing polyurethane components typically required pressures of about 800 to 2000 psi in order to achieve proper mixing.

The adhesive foam of the present invention can be dispensed in a single bead, a single spot or dot, or can be sprayed over a large area depending upon the items being bonded. Preferably, the adhesive foam is applied at a rate of about 0.5 to about 15.0 pounds per minute depending upon the particular application.

The reaction product of the two components is a froth liquid polyurethane adhesive foam. In the preferred method, the froth foam has an initial consistency similar to a foamy shaving cream. The froth adhesive foam is preferable over other types of foams because it can be neatly and accurately dispensed from the foam dispensing gun without blowing or overspraying onto areas of the substrate not to be bonded. The adhesive of the present invention with the shaving cream consistency does not run when placed onto steeply pitched substrates, such as a wall or rooftop, but remains where it is installed on the substrate. This ensures that the adhesive bond will be formed along the entire length of the substrate when the adhesive is so applied.

Upon dispensing, a reaction continues in which heat is generated due to the exothermic reaction of the components within the adhesive foam that aids the remaining hydrofluorocarbon to form bubbles or cells in the dispensed foam. This reaction causes the adhesive foam to begin expanding upon application to the construction substrate. This expansion is a particularly advantageous feature of the construction adhesive and the method of bonding of the present invention. The expansion of the adhesive foam allows gaps, crevices, and other imperfections to be filled.

The adhesive foam continues reacting until the cell structures become very coarse and cell rupture or collapse is initiated. The construction material is then placed in contact with the adhesive foam. Placing the construction material in contact with the adhesive foam causes further rupture of the cell structure of the adhesive foam and the foam partially collapses into a void-filling membrane. At this point in the reaction profile, the adhesive is building viscosity at a rapid rate and will conform to the thickness of whatever space is provided. It is important that the construction material and the construction substrate be properly placed relative to one another while the adhesive foam continues to react in order for the foam to collapse into the void-filling membrane.

The adhesive foam should be allowed to expand for between about 15 to about 120 seconds to allow cell rupture to begin before placing the construction material in contact with the adhesive foam. Preferably, the adhesive foam should be allowed to expand for at least about 30 seconds before placing the construction material in contact with the adhesive. Generally, no longer that about 120 seconds should elapse before the construction material is placed in contact with the adhesive foam. Preferably, no longer than about 60 seconds are allowed to elapse.

The two component polyurethane adhesive used in this method should have a rapid cure rate. Generally, the adhesive should cure within about 4 to about 10 minutes. Preferably, the adhesive should cure in about 6 to about 8 minutes providing for fast application. The rapid cure rate of the adhesive used in the method of the present invention eliminates the problems resulting from long cure times, typically several hours, normally associated with single component polyurethane adhesives. However, the cure time is not too short to timely place the elements to be bonded in proper position. Importantly, the rapid cure time of the two component polyurethane adhesive does not affect the bond strength between surfaces.

Another advantage of the method of the present invention is that it utilizes a reactive adhesive mechanism rather than an evaporative adhesive mechanism. Therefore, no solvents are necessary in the present invention such as chlorinated hydrocarbons or ketone based solvents which are typically used in other construction adhesives. This makes the method of the present invention more environmentally "friendly".

The adhesive and method of bonding of the present invention provide excellent bonding between two surfaces due to the adhesive properties of the urethane. The adhesive and the method of bonding of the present invention provide some elasticity to the bonded surfaces which allows for some movement between the substrate and the material. The two-component polyurethane adhesive is water proof, semi-flexible, and odorless. In addition, since the two adhesive components are separated until they are dispensed for use, this adhesive product is storage stable for about eighteen months or longer. Furthermore, the manufacture of a two component system and the low cost delivery system of the adhesive makes the present invention cost competitive with current adhesive systems such as those dispensed from caulking guns. Additionally, the fact that the entire system can be made portable is also a significant advantage.

The following examples disclose particularpreferred embodiments of the present invention, but are not intended to limit the scope of either the adhesive or the method of bonding.

EXAMPLE 1

Figure 1:
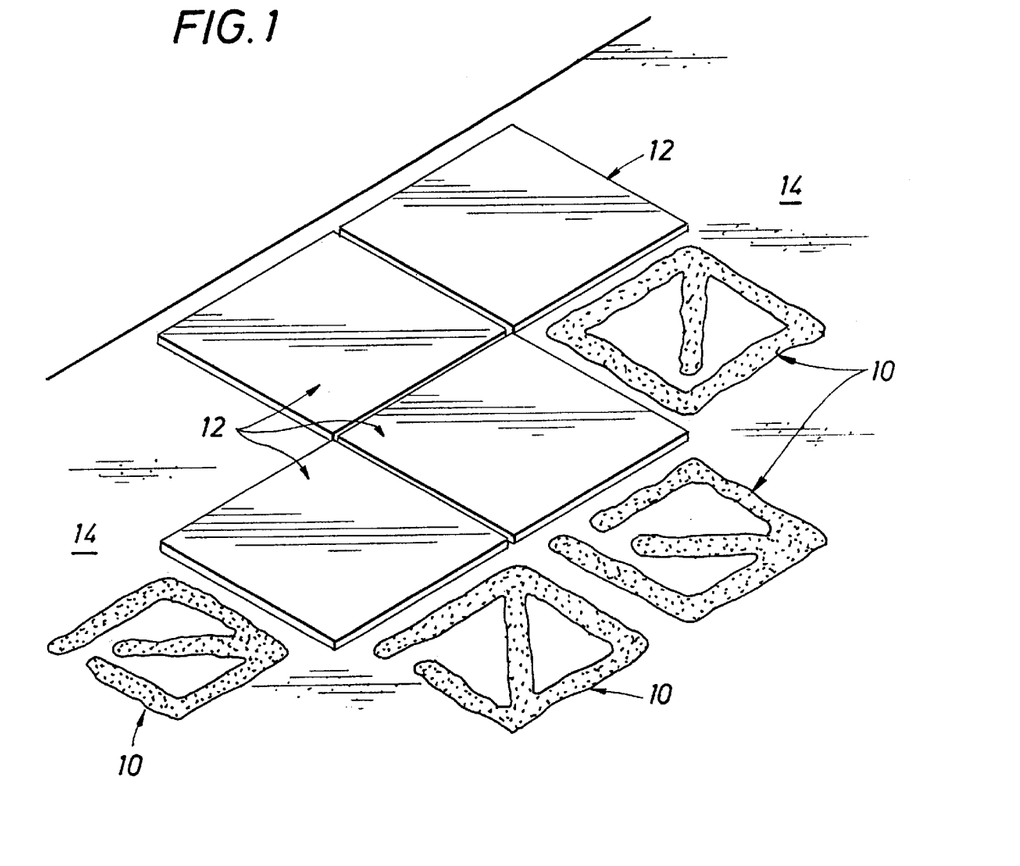
FIG. 1 is a perspective view of a portion of a tile or wood parkay flooring being installed on a wood or concrete subfloor using the present invention.

In one preferred embodiment, the present invention provides a method for adhesion of tiles 12 bonded in surface-to-surface contact with a subfloor substrate 14 such as concrete (FIG. 1). The adhesive 10 of the present invention is applied in a stream on the concrete floor substrate. The consistency of the adhesive 10 allows it to remain where applied without running onto areas not desired to be bonded. At this point, the adhesive 10 has a reactivity period of about six to about eight minutes during which the adhesive 10 must come into contact with the ceramic tiles 12 in order for these tiles 12 to be bonded to the floor substrate 14.

Upon application of the tiles 12 to the foam adhesive, the foam bubbles burst causing the foam to collapse into a thin, adhesive membrane. The combination of the expanding and collapsing nature of the foam during the reactivity period, allows gaps and imperfections between the two surfaces to be filled by the adhesive 10. This is a highly desirous property of the adhesive 10 as it allows irregularly shaped or non-planar tiles 12 to be completely bonded to the floor substrate 14 preventing the undesired rocking motion often exhibited by irregularly shaped tiles 12 not completely bonded to the surface substrate 14. Once the adhesive 10 cures, the tiles 12 are bonded to the floor substrate 14.

EXAMPLE 2

Figure 2:
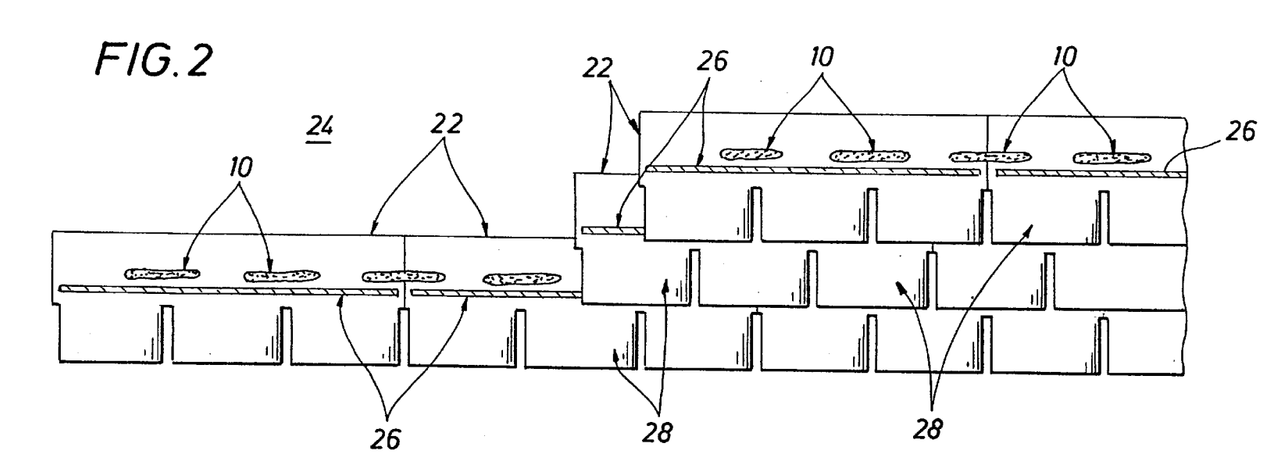
FIG. 2 is a top view of typical roof shingles being installed in an overlapping fashion on a roof substrate using the present invention.

In another preferred embodiment, the present invention provides a method for adhesion of asphalt shingles 22 to a roof substrate 24 (see FIG. 2). Asphalt shingles 22 are particularly vulnerable to damage in high wind areas such as found in coastal terrain. Although shingle manufacturers provide a method of adhering the shingle tabs 28 using a bitumen heat activated strip 26, the bond provided by this strip 26 is not sufficient to prevent the asphalt shingles 22 from tearing loose during a high wind event such as a hurricane. The application of a small bead of the two component adhesive 10 of the present invention beneath the shingle tab 28 provides the bond necessary to greatly reduce or eliminate shingle tear off during high wind events.

EXAMPLE 3

Figure 3:
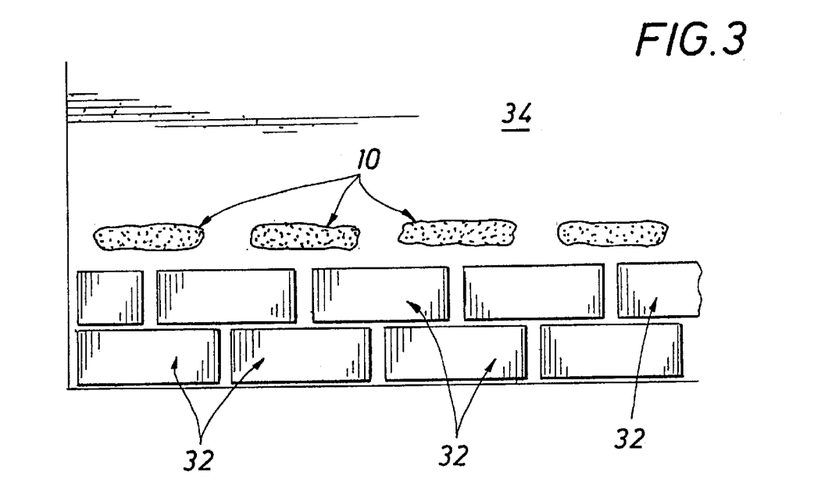
FIG. 3 is a side view of decorative brick being installed on a wall substrate using the present invention.

In another preferred embodiment, the present invention provides for a method for adhesion of decorative bricks 32 to an appropriate wall substrate 34 (see FIG. 3). The fast cure rate allows for rapid installation while the flexible bond characteristics allow for substrate movement.

EXAMPLE 4

Figure 4:
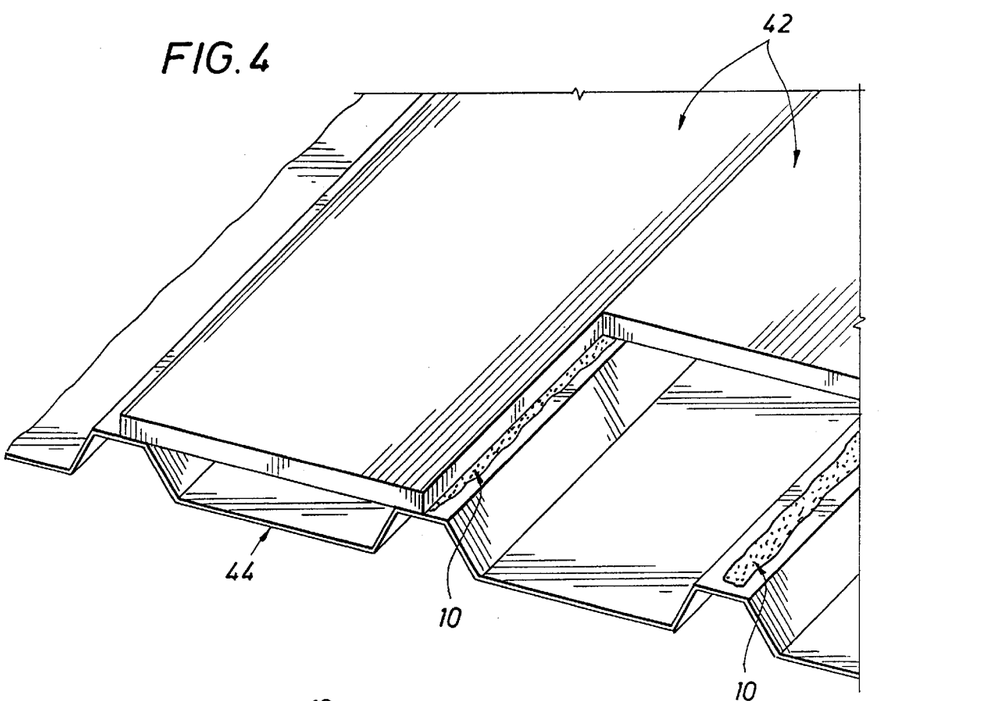
FIG. 4 is a perspective view of typical roof insulation boards being installed on a steel deck using the present invention.

In yet another preferred embodiment, the present invention provides for a method for adhesion of a roof insulation board 42 to a wood, concrete or steel deck 44 (see FIG. 4). The advantages of the present invention include fewer or no mechanical fasteners and a rapid cure rate. In addition, unlike single component urethane adhesion systems, the adhesion system of the present invention will not expand and move the roof boards 42.

EXAMPLE 5

Figure 5:
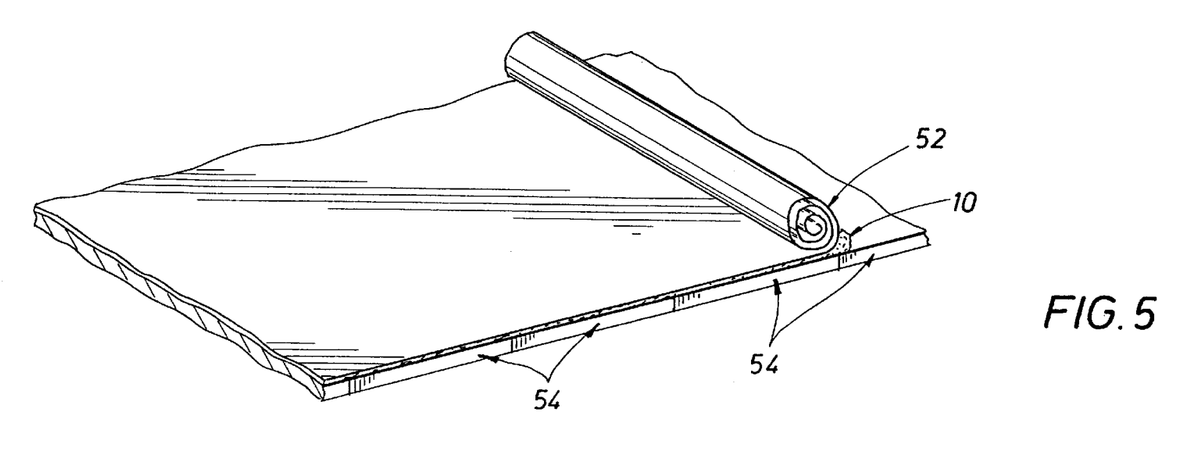
FIG. 5 is a perspective view of a typical roofing membrane being installed on an insulation board using the present invention.

In another preferred embodiment, the present invention provides for a method of adhesion of a roof membrane 52 to insulation boards 54 (FIG. 5).

EXAMPLE 6

Figure 6:
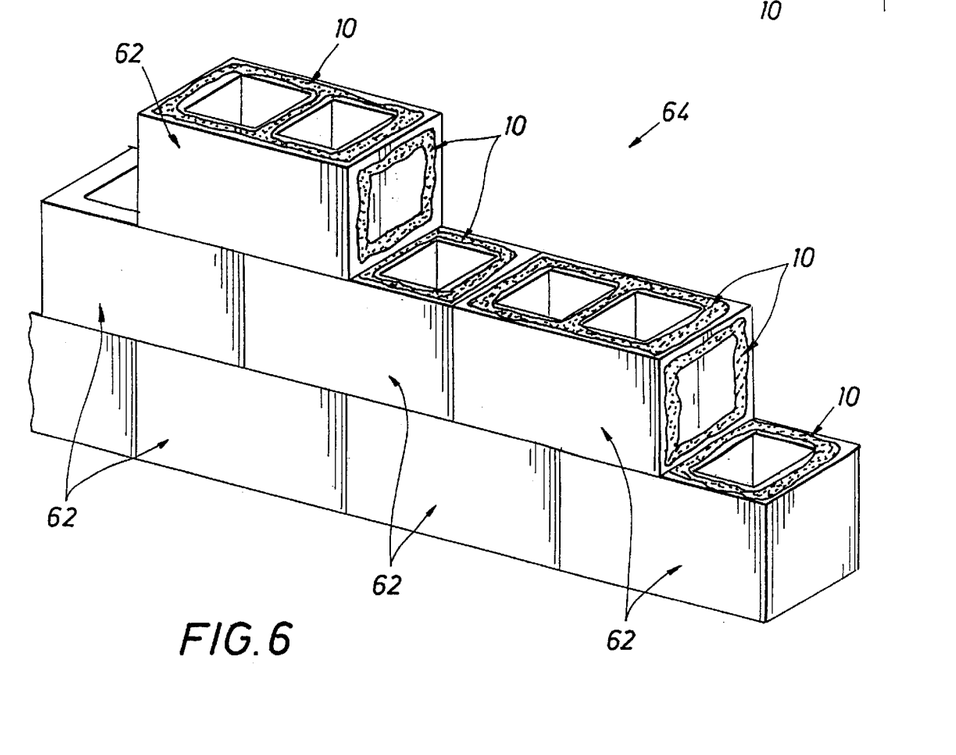
FIG. 6 is a perspective view of a concrete block wall installation using the present invention.

In another preferred embodiment, the present invention provides for a method of adhesion of cement blocks 62 (cinder blocks) commonly used in building wall 64 construction (FIG. 6). Prior art methods of using mortar to provide adhesion is very labor intensive. Additionally, any movement of the constructed wall 64 caused by settling can cause the mortar joint to crack and reduce the integrity of the wall. The adhesive 10 of the present invention provides some flexibility that can prevent joint failure.

EXAMPLE 7

In one preferred embodiment, the present invention provides an adhesive composition comprising an isocyanate or A-side component and a polyol blend or B-side component. The A-side component and the B-side component are prepared separately and contacted together immediately prior to applying the adhesive composition to a substrate. Table 1 shows the ratios of ingredients in the A-side and B-side components. The quantities of the ingredients are expressed as parts by weight.

TABLE 1

| A-Side | | B-Side | |
| --- | --- | --- | --- |
| Isocyanate[1] Rubinate M | 90 | Poly G30-168 | 26 |
| Flame retardant TCPP | 5 | Poly G74-376 | 38 |
| Emulsifier DE Acetate | 2 | Emulsifier, [Neodene 16, Alpha Olefin] | 8.0 |
| 134a | 3 | Extender, Diethylene glycol | 9.6 |
|  |  | Flame Retardant | 3.6 |

TABLE 1-continued

| A-Side | B-Side | |
| --- | --- | --- |
|  | TCPP |  |
|  | Catalyst, Witco UL-22 | 0.3 |
|  | 134a | 11.5 |
|  | Compatibilizer ethoxylated nonyl phenol | 7 |

[1]Isocyanate with an average 350 MW

EXAMPLE 8

In another preferred embodiment, the present invention provides an adhesive composition as shown in Table 2. All quantities of ingredients are expressed in parts by weight.

TABLE 2

| A-Side | | B-Side | |
| --- | --- | --- | --- |
| Prepolymer[1] | 84 | Poly G55-56 | 18 |
| Flame retardant | 11.5 | Poly G32-56 | 16 |
| 134a | 5 | Poly G30-168 | 37 |
|  |  | Extender, Diethylene glycol | 12 |
|  |  | Emulsifier, [Neodene 16, Alpha Olefin] | 6 |
|  |  | Catalyst, Witco UL-22 | 0.3 |
|  |  | 134a | 10.7 |

[1]Polymeric MDI with 4000 MW diol—Poly G55-28

The foregoing disclosure and description of the invention are illustrative and explanatory thereof, and various changes in the details of the illustrated adhesive and method of bonding may be made without departing from the spirit of the invention.

What is claimed is:

1. A polyurethane adhesive, comprising;
   a reaction product of an isocyanate prepolymer and a polyol blend;
   wherein the isocyanate prepolymer comprises a reaction product of an isocyanate and at least one polyol, and further comprises a first soft hydrofluorocarbon;
   wherein the polyol blend comprises at least two polyether polyols, and a second soft hydrofluorocarbon;
   wherein a reaction of the prepolymer and the blend produces a frothing foam having a consistency that prevents migration when applied to a substrate;
   wherein the frothing foam expands from continued reaction; and
   wherein the frothing foam partially collapses forming a void-filling membrane.

2. The polyurethane adhesive of claim 1, wherein the isocyanate prepolymer comprises a reaction product of an isocyanate and a polyether polyol having a functionality of three.

3. The polyurethane adhesive of claim 1, wherein the isocyanate prepolymer comprises a reaction product of a polymeric MDI (diphenylmethane diisocyanate) and a polyether polyol.

4. The polyurethane adhesive of claim 2, wherein the polyether polyol comprises a polyol capped with ethylene oxide having a primary hydroxyl content of from about 15% to about 70% and a nominal molecular weight between about 1000 to about 6500.

5. The polyurethane adhesive of claim 2, wherein the polyether triol comprises a nominal 1400 molecular weight triol capped with ethylene oxide having a primary hydroxyl content of at least about seventy percent.

6. The polyurethane adhesive of claim 1, wherein the isocyanate prepolymer comprises the reaction of an isocyanate and a polyether diol.

7. The polyurethane adhesive of claim 6, wherein the polyether diol comprises a diol capped with ethylene oxide having a primary hydroxyl content of from about 15% to about 85% and a nominal molecular weight of between about 1000 to about 6500.

8. The polyurethane adhesive of claim 6, wherein the polyether diol comprises a nominal 4000 molecular weight diol capped with ethylene oxide having a primary hydroxyl content of about 85%.

9. The polyurethane adhesive of claim 1, wherein the isocyanate prepolymner further comprises a flame retardant.

10. The polyurethane adhesive of claim 1, wherein the first soft hydrofluorocarbon and the second soft hydrofluorocarbon are selected from a group consisting of HCFC-R22 (CHCl $F_2$) and HCR-134A (1,1,1,2-tetraflvoro ethane).

11. The polyurethane adhesive of claim 1, wherein the isocyanate prepolymer comprises between about 18% and about 28% of free isocyanate groups.

12. The polyurethane adhesive of claim 1, wherein the isocyanate prepolymer comprises between about 20% and 24% free isocyanate groups.

13. The polyurethane adhesive of claim 1, wherein the polyol blend comprises a first polyol having a nominal molecular weight of about 6500, a second polyol having a nominal molecular weight of about 1000, and a third polyol having a nominal molecular weight of about 1400.

14. The polyurethane adhesive of claim 13, wherein the first polyol comprises a triol capped with ethylene oxide having a primary hydroxyl content of at least about 70%; the second polyol comprises a oxypropylated polyether triol; and the third polyol comprises an ethylene oxide capped triol having a primary hydroxyl content of at least about 70%.

15. The polyurethane adhesive of claim 13, wherein the polyol blend comprise about 20% to about 35% by weight of the first polyol, about 35% to about 50% by weight of the second polyol, and about 15% to about 25% by weight of the third polyol.

16. The polyurethane adhesive of claim 1, wherein the polyol blend comprises a first polyol having a nominal molecular weight of about 2000, a second polyol having a nominal molecular weight of about 3000, and a third polyol having a nominal molecular weight of about 1000.

17. The polyurethane adhesive of claim 16, wherein the first polyol comprises an ethylene oxide capped diol having a primary hydroxyl content of from about 70% to about 88%, the second polyol comprises an internally oxyethylated polyether triol; and the third polyol comprises an oxypropylated polyether triol having about 100% secondary hydroxyl groups.

18. The polyurethane adhesive of claim 17, wherein the polyol blend comprises about 14% to about 22% by weight of the first polyol, from about 12% to about 28% by weight of the second polyol, and from about 20% to about 40% by weight of the third polyol.

19. The polyurethane adhesive of claim 1, wherein the polyol blend further comprises a diol extender.

20. The polyurethane adhesive of claim 1, wherein the polyol blend further comprises an emulsifier.

21. A polyurethane adhesive, comprising;

the reaction product of an isocyanate and a polyol blend;

wherein the isocyanate further comprises a first soft hydrofluorocarbon;

wherein the polyol blend comprises at least two polyether polyols, and a second soft hydrofluorocarbon;

wherein a reaction of the isocyanate and the blend produces a frothing foam having a consistency that prevents migration when applied to a substrate;

wherein the frothing foam expands from continued reaction; and wherein the frothing foam partially collapses forming a void-filling membrane.

22. The polyurethane adhesive of claim 21, wherein the polyol blend comprises a first polyol having a nominal molecular weight of about 1200 and a second polyol having a nominal molecular weight of about 1000.

23. The polyurethane adhesive of claim 22, wherein the first polyol comprises a sucrose-based polyol capped with propylene oxide and the second polyol comprises a triol capped with propylene oxide having a secondary hydroxyl content of at least 90%.

24. The polyurethane adhesive of claim 22, wherein the polyol blend comprises about 28% to about 46% by weight of the first polyol and about 20% to about 32% by weight of the second polyol.

25. The polyurethane adhesive of claim 22, wherein the first polyol comprises a sucrose-based polyol having a hydroxyl number of about 375 and the second polyol comprises an oxypropylated polyether triol.

26. The polyurethane adhesive of claim 22, wherein the polyol blend comprises about 34% to about 40% by weight of the first polyol and about 22% to about 30% by weight of the second polyol.

27. The polyurethane adhesive of claim 21, wherein the isocyanate further comprises an emulsifier.

28. The polyurethane adhesive of claim 21, wherein the isocyanate comprises an isocyanate having a nominal molecular weight of from about 150 to about 500.

29. The polyurethane adhesive of claim 21, wherein the isocyanate comprises between about 25% and about 50% free isocyanate groups.

30. The polyurethane adhesive of claim 21, wherein the isocyanate comprises between about 12% and 15% free isocyanate groups.

31. The polyurethane adhesive of claim 21, wherein the isocyanate further comprises a flame retardant.

32. The polyurethane adhesive of claim 21, wherein the first soft hydrofluorocarbon and the second soft hydrofluorocarbon are selected from the group consisting of HCFC-R22 (CHCl $F_2$) and HCF-134A (1,1,1,2-tetraflvoro ethane).

33. The polyurethane adhesive of claim 21, wherein the polyol blend further comprises a diol extender.

34. The polyurethane adhesive of claim 21, wherein the polyol blend further comprises an emulsifier.

* * * * *